United States Patent [19]

Herr et al.

[11] 3,891,876
[45] June 24, 1975

[54] PERMANENT MAGNET ELECTRIC MOTOR HAVING A NON-FERROUS SOLID ARMATURE

[75] Inventors: john A. Herr, Garwood; Wolfgang Jaffe, Roselle Park, both of N.J.

[73] Assignee: The Singer Company, New York, N.Y.

[22] Filed: Aug. 2, 1974

[21] Appl. No.: 494,265

Related U.S. Application Data

[63] Continuation-in-part of Ser. No. 427,178, Dec. 21, 1973, abandoned.

[52] U.S. Cl. ............ 310/43; 310/154; 310/40 MM; 310/264
[51] Int. Cl.² ......................................... H02K 1/04
[58] Field of Search .................... 310/43, 152–156, 310/261–265, 266, 268, 40, 40 MM

[56] References Cited
UNITED STATES PATENTS

| | | | |
|---|---|---|---|
| 2,332,877 | 10/1943 | Villard | 310/265 X |
| 2,623,187 | 12/1952 | Adams | 310/154 |
| 3,422,295 | 1/1969 | Parker | 310/154 X |
| 3,424,578 | 1/1969 | Strnat et al. | 148/105 X |
| 3,638,055 | 1/1972 | Zimmerman | 310/43 |

*Primary Examiner*—Donovan F. Duggan
*Attorney, Agent, or Firm*—Robert E. Smith; Marshall J. Breen; Edward L. Bell

[57] ABSTRACT

A structure for an electric motor is disclosed wherein a single solid non-magnetic armature having commutated windings thereon is mounted for rotation centrally of a single air gap formed between opposed pairs of permanent magnets having oppositely polarized and preferably flat poles facing said armature.

5 Claims, 3 Drawing Figures

3,891,876

PERMANENT MAGNET ELECTRIC MOTOR HAVING A NON-FERROUS SOLID ARMATURE

This is a continuation in part of application, Ser. No. 427,178 filed Dec. 21, 1973, now abandoned.

FIELD OF THE INVENTION

This invention relates to the structure of small permanent magnet D.C. motors especially of the type having two diametrically spaced brushes and suitable for driving sewing machines, portable tools and the like and includes applications wherein small size, light weight, high torque-to-inertia ratio, long brush life and freedom from inherent electromagnetic interference (EMI) are important factors.

DESCRIPTION OF THE PRIOR ART

In all prior art permanent magnet motors of which we are aware, it has been necessary to employ air gaps which are small relative to the armature diameter. In the case of conventional armatures having iron laminations, the torque-to-inertia ratios have been poor and the large armature inductance has contributed to poor commutation and inherently large EMI. In order to overcome these disadvantages, resort has been to non-ferrous armatures but the small air gap limitation has resulted in fragile armatures in which the conductors are supported on a thin molded disc or on the surface of a thin annular molded drum. In either case, the required connection of the armature shaft to such a thin disc or drum has posed a difficult mechanical problem and still results in undesirable positional instability and limited torque transmission.

SUMMARY OF THE INVENTION

With the recent introduction of the new rare-earth alloy permanent magnets, particularly those sold under the trade name "Lanthanet", a new approach to the design of permanent magnet motors is possible according to the present invention whereby the small air gap limitation is removed and the shortcomings of the prior art are overcome. The term "air gap" is used herein in the connotation regularly used in the art as defined, for instance, in the Modern Dictionary of Electronics, published 1970 by Bobbs-Merrill Co., Inc. as "A Non-magnetic discontinuity in a ferro-magnetic circuit".

According to the present invention, it has been found that, by using the rare-earth-alloy magnets, a practical motor structure can be made having between opposing pairs of magnets a single air gap sufficiently large to contain a single solid non-magnet armature securely mounted on a single shaft journalled for rotation at both ends. The armature is sufficiently large to contain peripheral slots in which commutated windings are placed. Sufficient air gap flux is provided by the high coercive force of the rare-earth alloy magnets, in spite of the large air gap, to provide practical D.C. motors having many substantial advantages over the prior art motors.

DESCRIPTION OF THE DRAWINGS

In the drawings,

Referring now to FIG. 1, a U-shaped yoke 2, made of magnetically permeable material, forms wtih a brush plate 3 preferably made of electrically insulating material and secured to the yoke 2 by screws 7—7, a supporting frame for a motor.

Figure 1:
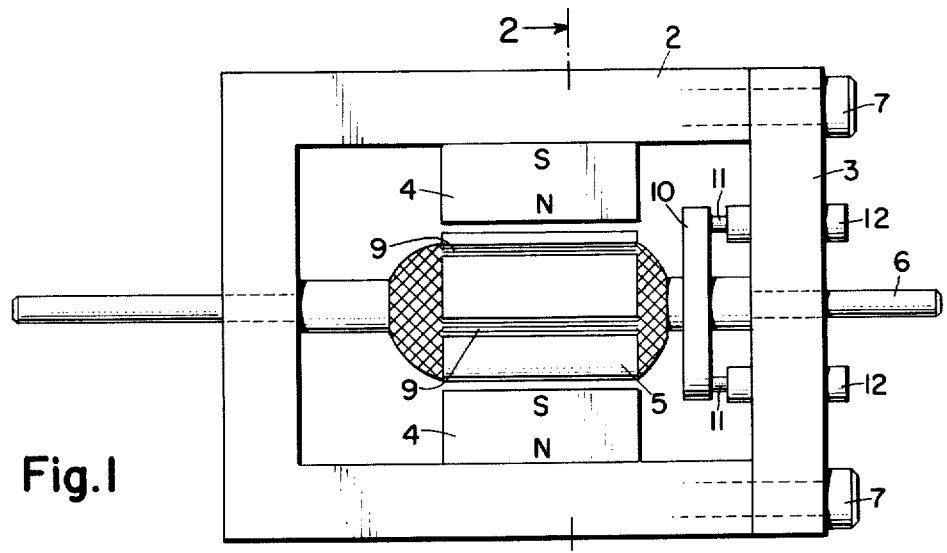
FIG. 1 is a longitudinal elevational view of a motor structure embodying this invention.

Secured to the inner faces of each leg of the yoke 2, as by epoxy cement, is a block-shaped permanent magnet 4. These magnets 4—4 are preferably made of rare-earth cobalt alloys and especially those sold under the trade name Lanthanet. Each magnet is magnetized across the small dimension and they are assembled in relative opposing relation so that the inner faces of the magnets present preferably flat poles of opposite polarity as shown by the letters N,S in FIG. 1 and form the single working air gap for the motor.

Inasmuch as the permanent magnets 4—4 of this invention are formed by powder metallurgy techniques and are difficult to machine, the bar or block form represents the most economical form to manufacture and this results in the flat pole face structure which provides uniform flux density in the working gap and is therefore indicated as the preferred form.

Figures 2, 3:
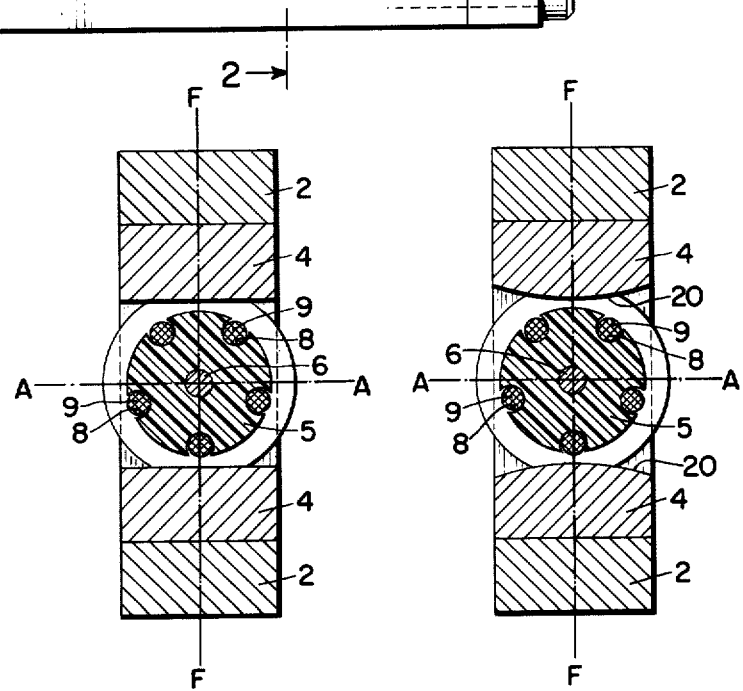
FIG. 2 is a section taken on line 2—2 of FIG. 1.
FIG. 3 illustrates a modified embodiment of this invention and is the same as FIG. 2 except that the pole faces have a convex form.

However, the ideal flux distribution in the working gap, from the standpoint of good commutation, demands that the flux density be reduced at the pole tips where the armature coil slides undergoing commutation are located. This may be accomplished by making the pole faces slightly convex as shown in FIG. 3, wherein the convex pole faces 20—20 are clearly shown and represents a modification clearly within the scope of this invention.

It will be understood that the yoke 2 functions as a low-reluctance return path for the flux supplied by the magnets 4—4 and produces in the air gap between the poles N-S a working flux field of high flux density due to the large coercive force of the magnets 4—4.

Located centrally of the air gap described above is a solid cylindrical armature 5. While this armature 5 may be made of any non-magnetic material, it is preferable, for the purposes of this invention, to employ a light-weight molded plastic insulating material with a rotor shaft 6 molded integrally therein. The shaft 6 is journalled for rotation in suitable bearing means located at one end in the yoke 2 and at the other end in the brush plate 3. This structure provides rigid positional stability for the armature in the air gap and affords maximum torque transmission to the shaft 6.

The armature 5 is formed with longitudinal peripherally-shaped slots 8 in which are located windings 9 connected, in conventional manner, to a face commutator 10. Brushes 11—11 held in brush boxes 12—12, secured to the brush plate 3, bear against the commutator 10 and provide current conduction to the armature windings 9 from an external voltage source (not shown) in a manner well known in this art. Since the armature 5 is already formed from electrically insulating material, there is no need for separate slot insulation so that the entire slot space 8 can be more efficiently utilized to contain the armature winding 9 and results in desirably more copper per slot than would be the case with the conventional iron armature with separate slot insulation.

Furthermore, this solid cylindrical armature is fully compatible with and may be automatically wound on conventional winding machines.

Inasmuch as the armature 5 of this invention contains no magnetic material except possibly for the shaft 6, which in any case, is small compared with the armature diameter, and can, if necessary, be made of non-magnetic stainless steel, the presence of the non-magnetic armature 5 exerts little or no influence on the distribution of flux in the air gap and, therefore, the magnets 4—4 can be most simply formed with flat poles and the air gap flux density will be desirably uniform. It will be seen that this naturally results in a structure in which the armature has a diameter and length commensurate with the dimensions of the permanent magnets taken transversely of the direction of magnetization.

As seen best in FIG. 2, the armature reaction magnetomotive force due to the armature current acts substantially along the axis A—A which is essentially at right angles to the field flux axis indicated at F—F. Thus, the return path for the armature reaction flux is largely through air and transversely through the magnets 4—4 which (for the rare-earth alloy material used) has substantially the same low permeability as air resulting in a high reluctance and a low flux. The return path for the field flux, on the other hand, is through the yoke 2 of high permeability resulting in low reluctance and high flux. This combination of high field flux and low armature reaction flux is highly desirable and results in substantially no distortion of the air gap flux due to armature current. Thus the commutation is not adversely affected by changes in load as in conventional prior art motors. Further, there is substantially no demagnetizing effect on the permanent magnets due to armature current which is important to the long term stability of the motor characteristics.

From the above description, it will be evident that the present invention defines electric motor structure for small commutator type motors, which structure greatly improves all the desirable characteristics of such motors without compromise. This structure is based on the principle of a single solid non-magnetic cylindrical armature mounted for rotation centrally of a single air gap formed between opposed permanent magnets having oppositely polarized poles facing said armature, which poles may have face surfaces which are flat or slightly convex.

Other modes of applying the principle of the invention may be employed, change being made as regards the details described provided the features stated in any of the following claims, or the equivalents of such, are employed.

For example, while a face commutator with axial brushes is shown as illustrative of a working embodiment of this invention, it is clearly within the scope of this invention to substitute therefore a cylindrical commutator and radial brushes. Further, it will be understood that this invention includes within its scope, motor structure having any desired number of pole pairs as may be dictated by the size and output capacity of the motor.

Having thus described the nature of the invention, what is claimed is:

1. In an electric motor, a single solid non-magnetic cylindrical armature having commutated windings thereon, means for rotationally mounting said armature about the cylindrical axis thereof radially within a single air gap formed by peripheral permanent magnets having oppositely polarized pole faces facing the axis of said armature.

2. In an electric motor according to claim 1, wherein the pole face surfaces are convex.

3. In an electric motor according to claim 1, wherein the permanent magnets are formed from rare-earth alloys.

4. In an electric motor, a non-magnetic cylindrical armature having commutated windings thereon, and mounted on a non-magnetic stainless steel motor shaft for rotation about the cylindrical axis of said armature radially within a single air gap formed between peripheral spaced permanent magnetic influenced poles having alternately oppositely polarized pole faces facing the axis of said armature.

5. In an electric motor according to claim 4 in which said armature comprises a solid synthetic plastic body secured on said motor shaft and formed with lengthwise peripheral slots for accommodating said commutated windings.

* * * * *